Oct. 14, 1958  J. CORRIGAN  2,856,083
APPARATUS FOR HANDLING SUGAR
Filed Oct. 14, 1954  7 Sheets-Sheet 1

Fig. 1.

Inventor,
Joseph Corrigan,
by
Atty.

Oct. 14, 1958 J. CORRIGAN 2,856,083
APPARATUS FOR HANDLING SUGAR
Filed Oct. 14, 1954 7 Sheets-Sheet 2

Inventor,
Joseph Corrigan,
by
Atty.

Oct. 14, 1958  J. CORRIGAN  2,856,083
APPARATUS FOR HANDLING SUGAR
Filed Oct. 14, 1954  7 Sheets-Sheet 6

Inventor,
Joseph Corrigan,
by
Atty.

United States Patent Office 2,856,083
Patented Oct. 14, 1958

2,856,083

APPARATUS FOR HANDLING SUGAR

Joseph Corrigan, Newton Center, Mass., assignor to J. C. Corrigan Company, Incorporated, Dorchester, Mass., a corporation of Massachusetts Application October 14, 1954, Serial No. 462,181

6 Claims. (Cl. 214—17)

This invention comprises novel and useful improvements of an automatic conveyor system and in general has reference to a conveyor system that greatly facilitates the movement of bulk, granulated or powdered material into or out of storage and which includes means to prevent and eliminate lumping or caking of such material immediately prior to or during the storage thereof. More particularly this invention relates to an improved conveyor system for the automatic transportation, into or out of large scale storage, of bulk granulated or powdered hygroscopic materials, such as sugar, salt, flour and the like, and which circulates or recirculates such material among a plurality of storage bins to prevent lumping or caking thereof, and which provides additional means to prevent and eliminate lumping or caking of such material immediately prior to or during the storage thereof.

Formerly, hygroscopic materials such as sugar, salt, flour, chemicals, or the like, were transported to the storage plants of large scale users in bags. Dirt and dust were often found in these bags and various contaminants were found within them. Regardless of precautions, it was practically impossible to prevent foreign material from entering the finished products in which the hygroscopic material was used. Furthermore, handling of the bags in which the hygroscopic material was stored was inevitably accompanied by leakage, breakage and waste, and was a relatively expensive procedure.

In the field of materials handling, the transportation or movement into or out of storage of bulk granulated, crushed, or powdered material is not new, per se. It is only in recent times that the large scale bulk handling of bulk granulated or powdered hygroscopic material has been attempted. These efforts, made to overcome the inefficiency, cost and difficulty of handling such material in bags, has, till now, met with rather indifferent success mainly because of the strong tendency of hygroscopic materials, such as sugar, salt, flour, chemicals, and the like, to form lumps or become caked to their containers, storage bins or transportation cans. Such lumping and caking not only obstructs the free flow of the hygroscopic material and therefore impedes its handling in bulk during its movement into or out of storage, but also results in deteriorated quality and spoilage or waste during storage. To overcome these handicaps imposed on bulk handling of hygroscopic granulated or powdered material by the formation of lumps and caked layers often requires tedious procedures that are time-consuming as well as expensive and which may outweigh the advantages that otherwise might be offered by modern bulk-handling techniques. In aggravated cases of lumpiness or caking of the hygroscopic material stored in bulk, shutdown of the storage plant becomes inevitable while the lumps and caked material are steamed or chipped away and results in serious loss of material, time and money.

In attempts to overcome and prevent the formation of lumps or caking of the hygroscopic material, agitating devices of various sorts have been tried but since it is impractical to agitate, at one time, more than a small portion of the bulk hygroscopic material usually stored by large scale users of the material, such devices have generally been found ineffective. The problem of lumping or caking of bulk hygroscopic material is present during normal operational periods of the storage plant when movement of the material as it is being stored or withdrawn tends to decrease the tendency to lump or cake and when spilled, personnel are present to watch for and prevent such deterioration, but the problem becomes serious when the storage plant is shut down for repairs and during holidays or other inactive storage plant periods that need not be of great duration.

This invention, which overcomes the above-described disadvantages of prior methods of handling bulk hygroscopic granulated or powdered materials, is generally directed to the bulk handling of such hygroscopic materials as granulated or powdered sugar, salt, flour, chemicals and the like, immediately prior to and during the storage of such material in the storage plants of large scale users thereof. By means of this invention, the bulk hygroscopic material is unloaded from a freight car, such as that described in my patent application Ser. No. 439,116, titled Condensation-Proof Car and filed June 24, 1954, is conveyed into the storage plant and there diverted and guided to fill any of a plurality of storage bins. Also to prevent and eliminate caking or the formation of lumps of the hygroscopic material, the methods and apparatus of this invention provide means for circulating and recirculating the hygroscopic material among the storage bins after such material has been conveyed to the bins. In addition the apparatus to be described permits the material to be dispensed from storage in the amounts required for immediate use. All the operations performed through the method and apparatus which comprise this invention take place automatically and without wasting the hygroscopic material and in a manner that reduces handling cost, yet maintains the original purity of the hygroscopic granulated, or powdered material.

In particular my invention is directed to the prevention and elimination of caking or the formation of lumps of bulk hygroscopic granulated or powdered material such as sugar, salt, flour, chemicals, etc. during the unloading, conveying and storage thereof in a processing plant. Thus during temporary shutdowns of the plant during the night, on weekends, or because of temporary processing equipment failure, or for plant shutdowns due to other causes, the hygroscopic material may be continuously recirculated within the in-plant storage facilities with or without added means for breaking up any lumps or caked layers of the hygroscopic material that may exist, or be formed immediately prior to or during the storage period in spite of all precautions taken to prevent such a result.

This invention is also directed to the handling of bulk hygroscopic material such as granulated or powdered sugar, salt, flour, chemicals, etc. in a plant wherein the material is stored in bins and conveyed for use in processing equipment with other materials as needed, and has the important feature, when processing is not desired or feasible, of reversing the direction of flow of the hygroscopic material from the storage bins to cause said material to recirculate among the bins and through the conveying equipment to prevent the formation of caked layers or lumps of said hygroscopic material. A novel important additional feature of this invention consists of means for breaking up any lumps or caked layers of said hygroscopic material that may exist.

It is an object of this invention to unload bulk hygroscopic materials from a car in a completely sanitary and economical manner and without waste.

Another object of this invention is to protect said hygroscopic materials from external contaminants while said material is being unloaded from the car.

Another object of this invention is to convey said hygroscopic material automatically from the car to any one or more designated storage bins in the storage plant.

Another object of this invention is to dispense said hygroscopic material from any one or more designated storage bins to processing equipment as needed.

Another object of this invention is to circulate automatically at any desired rate the stored hygroscopic material through the storage conveying equipment and back to one or more designated storage bins to prevent the formation of caked layers or lumps of said hygroscopic material during storage.

Another object of this invention is to reverse the normal flow of hygroscopic material through the storage bins and conveyor system so that said hygroscopic material may be recirculated at any desired rate and thoroughly mixed among the several storage bins, a procedure which prevents the formation of caked layers or lumps of the said hygroscopic material during storage.

Another object of this invention is to cause the granulated or powdered hygroscopic material that is being stored or is about to be stored to pass through means which breaks up existing lumps or caked layers of hygroscopic material.

Another object of this invention is to provide sealed conveyors and storage equipment to prevent moisture, dirt, etc., from contaminating or causing lumping of the hygroscopic material being handled.

Another object of this invention is to ensure the free flow of the granulated or powdered hygroscopic material through the storage system and into the processing equipment where said material is used.

Other objects and advantages of my invention will be apparent during the course of the following description.

In the accompanying drawings, forming a part of this application, and representing only one embodiment of my invention, and wherein all conveyor or elevator systems are enclosed by suitable dust tight covers or means that protect the bulk hygroscopic material from contaminants and wherein all elements comprising the invention are rigidly supported in their proper relative positions by suitable supports or other means.

Referring now to the accompanying drawings wherein like numerals are employed to designate like parts throughout the various views.

Figure 1:
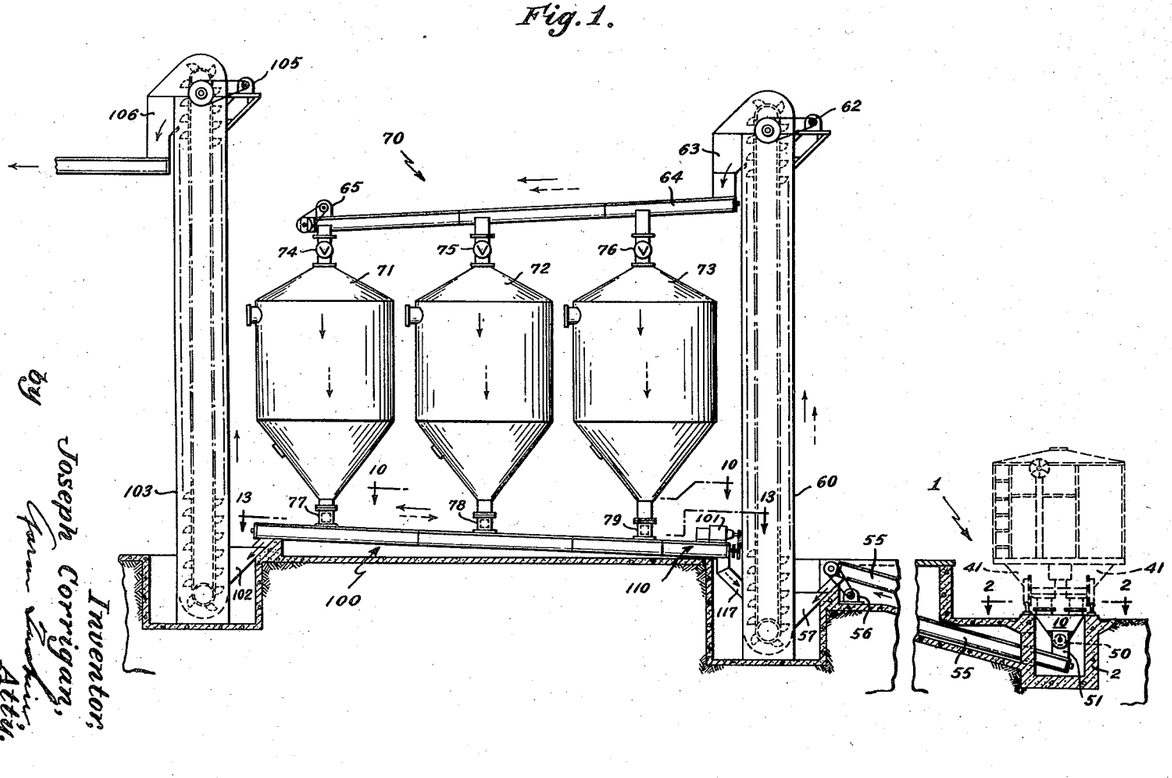
Figure 1 is a side elevation view, partly diagrammatic and partly shown in section illustrating an apparatus for carrying out the principles of my invention.

In Figure 1 the loading, storage and recirculating system in general comprises a sealed unloading unit 1 whose foundation or pit 2 contains receiving hoppers 10 and means later described for sealed coupling of car to be unloaded to said hoppers. The material being unloaded from the car is gravity-fed through hoppers 10 to spiral conveyor 50 contained in a suitably sealed housing and located in pit 2. From outlet 51 of conveyor 50 the material is fed to the sloping spiral conveyor 55 from which it drops through chute 57 to the loading bucket elevator 60. From bucket elevator 60 the material drops through chute 63 to spiral conveyor 64 and thus enters the storage and recirculating system 70. The storage bins 71, 72, 73 have valves 74, 75, 76 respectively, which individually control the flow of material from conveyor 64 into the storage bins. Thus the flow of material to one or more storage bins may be controlled as desired.

By means of the rotary vane feeders 77, 78, 79 conveniently placed beneath storage bins 71, 72, 73 respectively, the stored material is controllably fed to spiral conveyor unit 100. If direct feeding of the material to processing equipment is desired the rotation of spiral conveyor unit 100 is such that said conveyor unit transports the material to chute 102 through which said material drops to bucket elevator 103. By means of bucket elevator 103 the material is then transported to chute 106 through which it drops to a conveying system that takes the material to automatically controlled surge hoppers which in turn drop the material onto weighing equipment that weighs the material and is set to automatically dispense any desired amount of material to processing kettles. The unloading, storage and delivery circuit described above is further indicated in Figure 1 by means of directional arrows in full lines.

If operation of the lump-breaking and recirculation features of this system is desired, the rotation of spiral conveyor unit 100 is reversed so that said conveyor unit carries the material in a direction opposite to that described above for feeding the material to processing equipment. Thus for the recirculation operation the conveyor unit 100 carries the material toward the breaker unit 110 of conveyor unit 100. As the material passes through the breaker unit 110, lumps or caked portions of the material are disintegrated by means to be described. Then the material emerging from breaker unit 110 drops through chute 117 and enters loading bucket elevator 60 which, in turn, carries the material back to the chute 63 and thence to the storage and recirculation system 70. The lump-breaking and recirculation circuit described above is further indicated in Figure 1 by means of directional arrows in broken lines.

All the spiral conveyors, bucket elevators and chutes of the entire system are enclosed in suitable housings that seal these components against water, dust or dirt.

Figure 2:
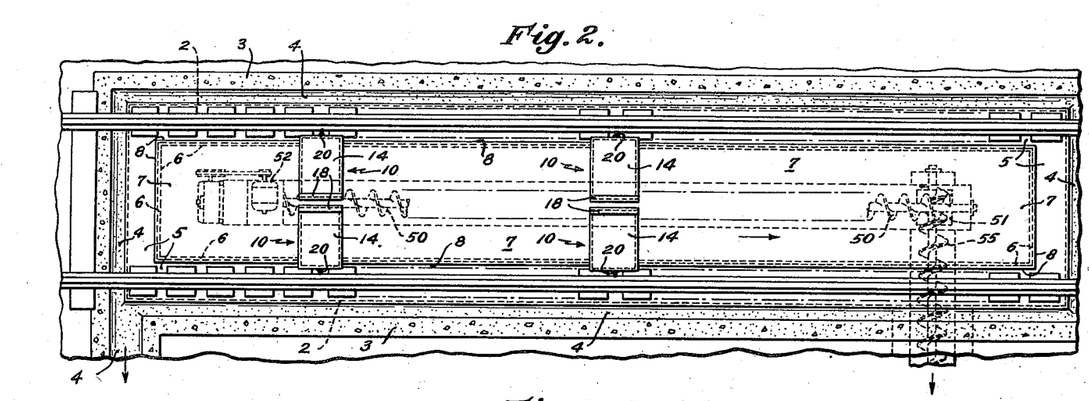
Figure 2 is a plan sectional view taken upon the plane of the section line 2—2 of Figure 1 and showing the unloading pit and the pit spiral conveyor.
Figure 3:
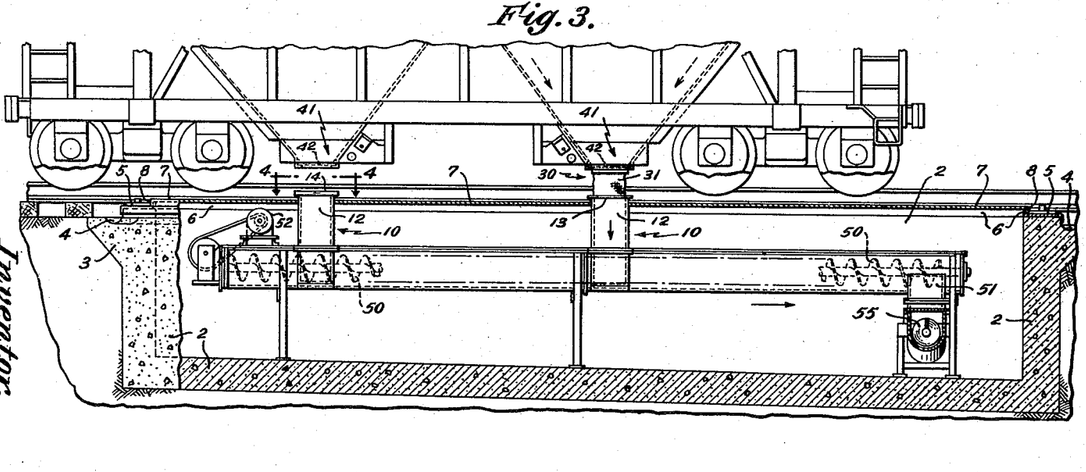
Figure 3 is a side elevation view of Figure 2, partly in section, parts being broken away, and showing part of a freight car over unloading pit and one hopper unit coupled to delivery outlet of car, and another hopper unit uncoupled and covered.

Referring to Figures 2 and 3, which show features of the unloading pit 2 in detail, the upper portion of pit 2 has peripheral drain shelf 3 and drain 4, peripheral pit apron plate 5 extending into drain 4 and suitably fastened to peripheral pit apron flange 6. The pit cover 7, which extends over the entire area of the pit 2 but contains hopper inlet openings that are covered by removable but closely fitting hopper covers 14 has a circumferential pit cover flange 8 that is sealed against the external surface of pit apron flange 6. The pit cover 7 prevents water, dirt, dust, insects or other undesired material from entering the pit 2 and the seal between the pit cover flange 8 and the pit apron flange 6 prevents water, dirt, dust or insects that may collect in the drain shelf 3 from entering the pit 2 across the pit periphery. Thus the pit cover 7, its flange 8, the pit apron plate 5 and the pit apron flange 6 as well as the seal between the pit cover flange 8 and the pit apron flange 6 serve to keep water, moisture, dirt or other undesired material from entering the pit 2. When no material is being unloaded into the pit 2 from a car, the hopper covers 14 fitting tightly over the hopper inlet openings in the pit cover 7 also keep all water, moisture or dirt from entering the pit 2.

Figures 4, 5:
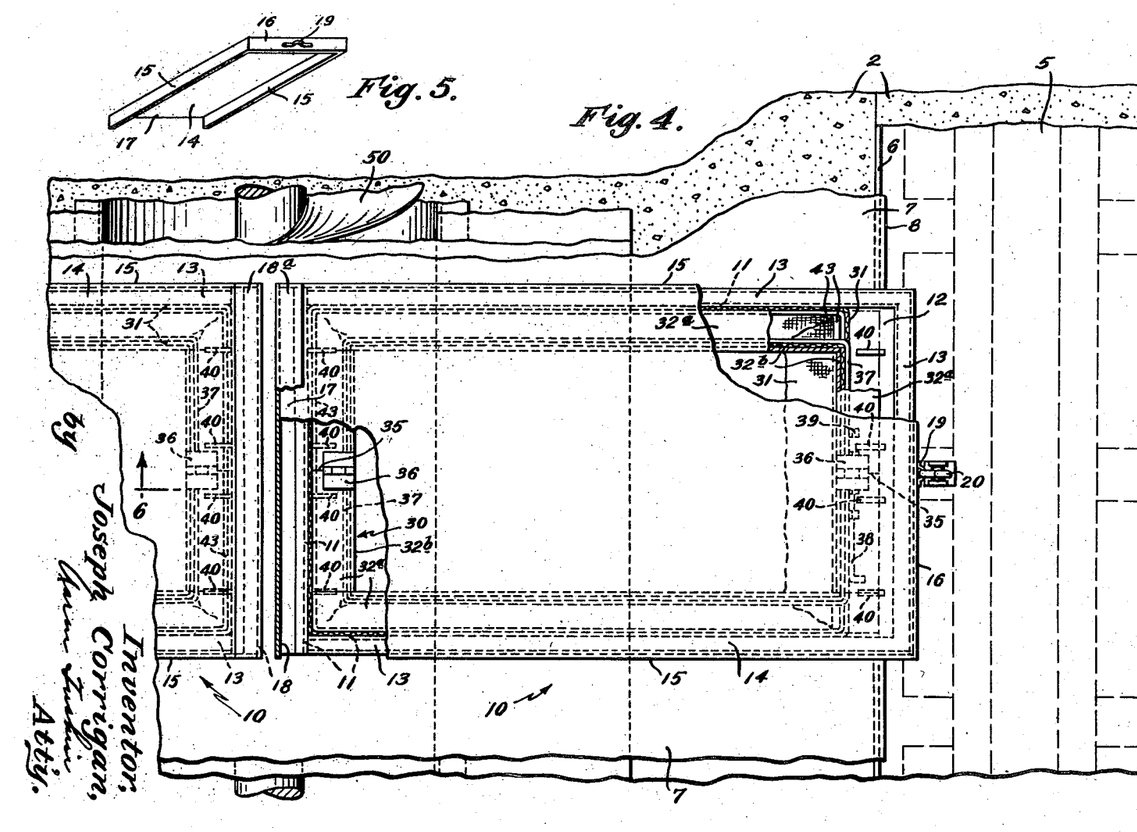
Figure 4 is a fragmentary plan view taken upon the plane of the section line 4—4 of Figure 3 with parts being broken away and illustrating details of the unloading pit with the intake hopper in its covered position.
Figure 5 is a perspective detail view of the receiving inlet cover.
Figure 6:
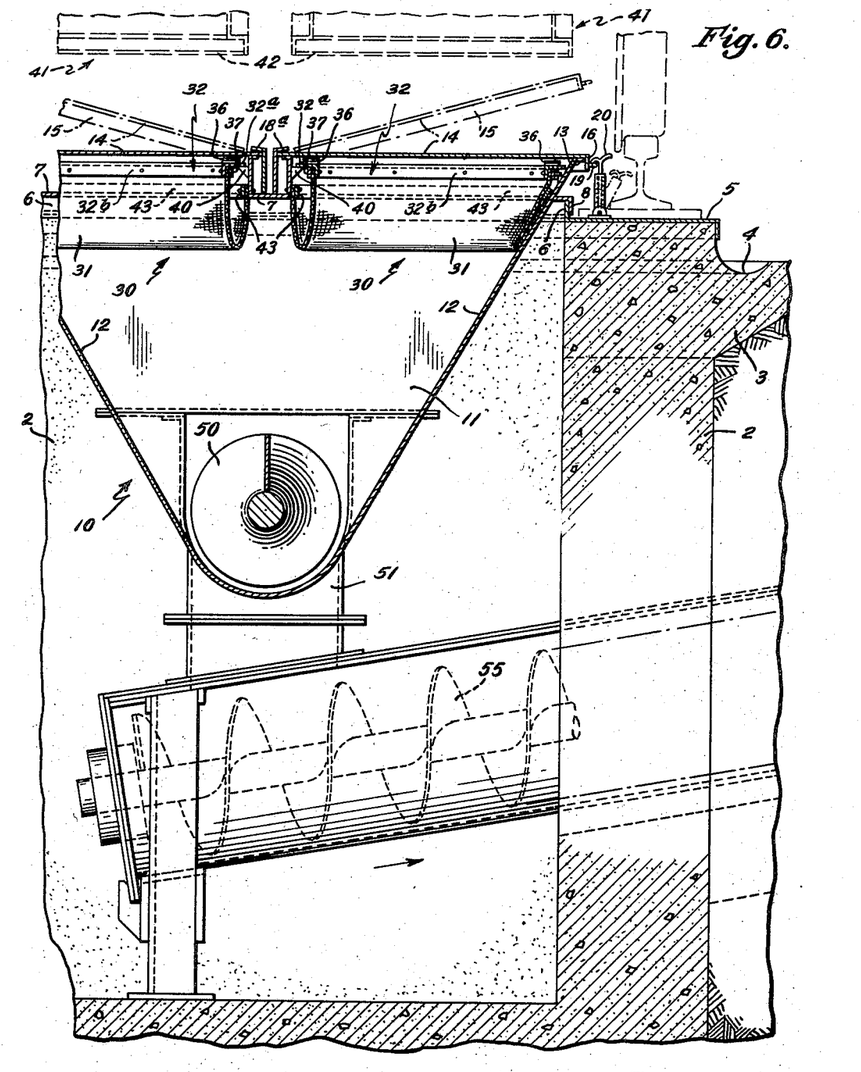
Figure 6 is a sectional view taken upon the plane of the section line 6—6 of Figure 4 showing a part of the unloading pit and pit spiral conveyor with the stockings in stored position and their covers in closed position.

As shown in Figures 2, 3 and 4 and with more detail in Figure 6 each receiving hopper 10 through which the material being unloaded from the car is gravity-fed to the trough of spiral conveyor 50 comprises the two parallel sides 11 transverse to the axis of spiral conveyor 50, the two sides 12 sloping toward the conveyor 50 and parallel to the axis of said conveyor, the top and bottom edges of sides 11 and 12 forming the hopper inlet and outlet respectively. When the hopper is in use material gravity-fed into the hopper from the car being unloaded is guided by the parallel sides 11 and inwardly sloping sides 12 of the receiving hopper 10 towards the hopper outlet and from said hopper outlet enters the conveyor trough of pit 2.

As shown in Figure 4 the pit cover 7 contains a rectangular opening placed over the inlet of each receiving hopper 10. To three edges of each such opening is fastened the hopper upper flange 13 and to the fourth edge of each such opening is fastened the hopper inlet cover backstop 18, the hopper inlet cover backstop cover retaining flange 18a and the spring loaded cover fastener 20.

When a receiving hopper 10 is not in use it is covered and sealed against external moisture or dirt by means of hopper cover 14 (Figure 5). As shown in Figure 4 the two side flanges 15 and the outward end flange 16 of cover 14 fit over the hopper upper flange 13 while the flangeless inward end 17 of cover 14 fits under the backstop 18. The metal loop 19 on the outward end flange 16 is held securely by the spring loaded fastener 19 of cover 14. Release of said fastener permits removal of the hopper cover 14. The cover 14 and hopper upper flange 13, backstop 18 and fastener 20 of the receiving hopper inlet in conjunction with flanges 15, 16 and 17 and fastener 19 of cover 14 form a seal that keeps moisture, dirt or other undesired material from seeping or entering into the receiving hopper 10 while said hopper is not in use.

The collapsible stocking assembly 30 (Figure 7) connected between a car unloading outlet 41 (Figures 3, 6 and 7) and the inlet of receiving hopper 10 during the car unloading procedure, comprises the tubular open-ended flexible stocking 31 made of canvas or similar material, the upper stocking coupling frame 32, the upper stocking coupling frame retaining flange 42 and the lower stocking holding ring 43.

Figure 7:
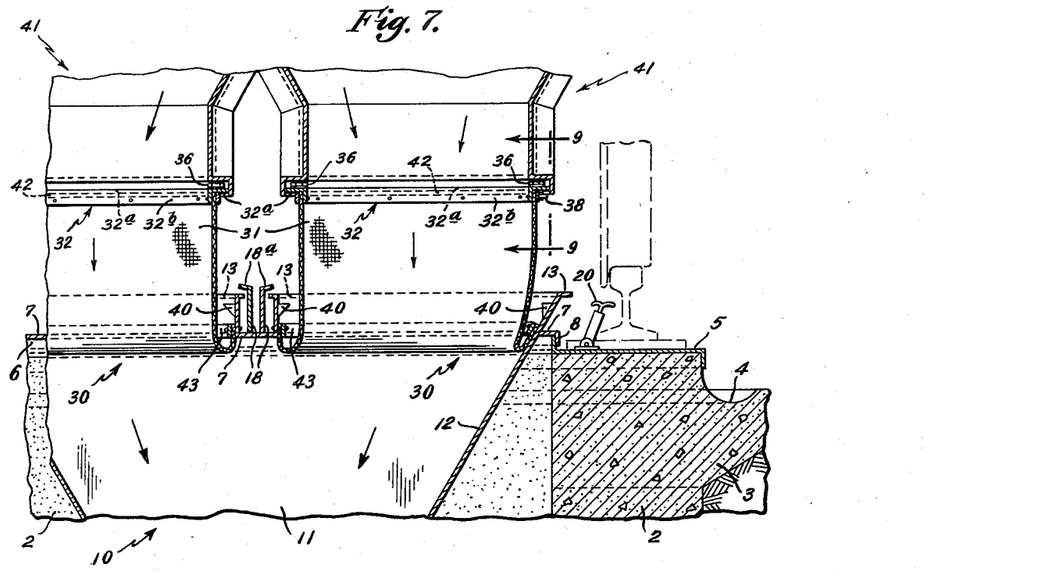
Figure 7 is a fragmentary elevation sectional view similar to part of Figure 6 but showing the stockings connected to the car hopper and in place for receiving the contents of the car.
Figure 8:
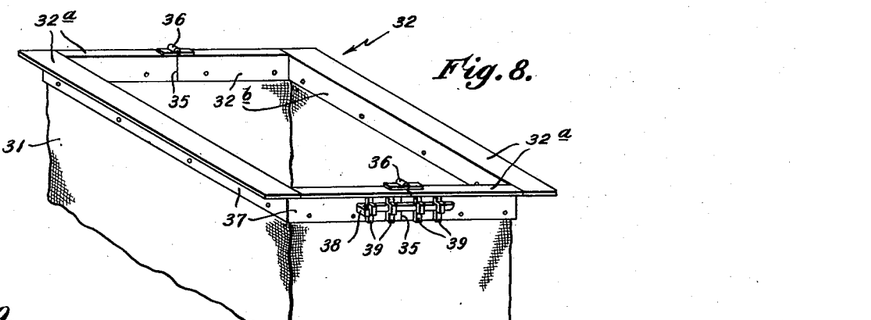
Figure 8 is a fragmentary perspective view showing the top of the stockings, the upper stocking frame and the means for locking the stocking frame in its receiving position.
Figure 9:
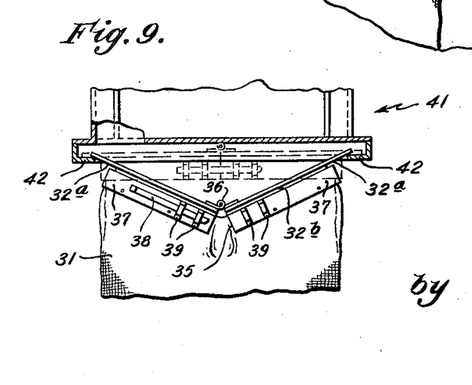
Figure 9 is a sectional view taken upon the section line 9—9 of Figure 7 showing the means and method for attaching the stocking and its frame to the bottom of the car hopper.
Figure 10:
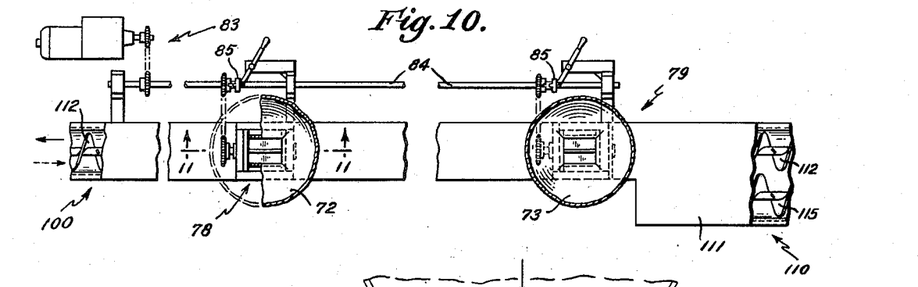
Figure 10 is a fragmentary sectional plan view taken upon the plane of the section line 10—10 of Figure 1 showing the reversible spiral conveyor extending between the bottoms of the storage bins, and the general means for driving the feeder units located between the bottoms of the bins and the top of combined reversible spiral conveyor and breaker unit.
Figure 11:
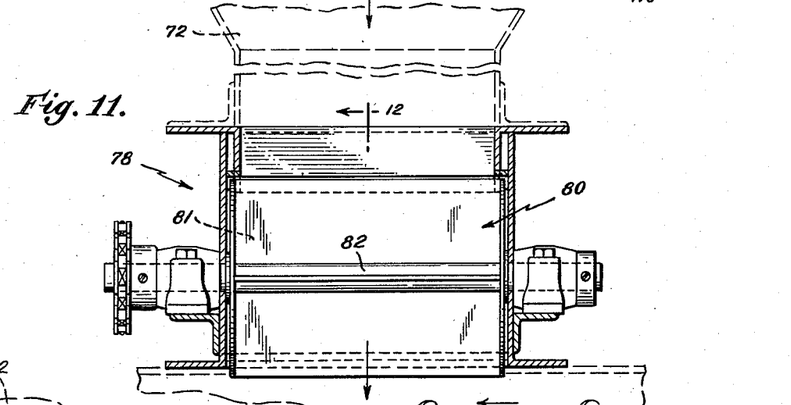
Figure 11 is a sectional view of a feeder unit taken upon the plane of the section line 11—11 of Figure 10.
Figure 12:
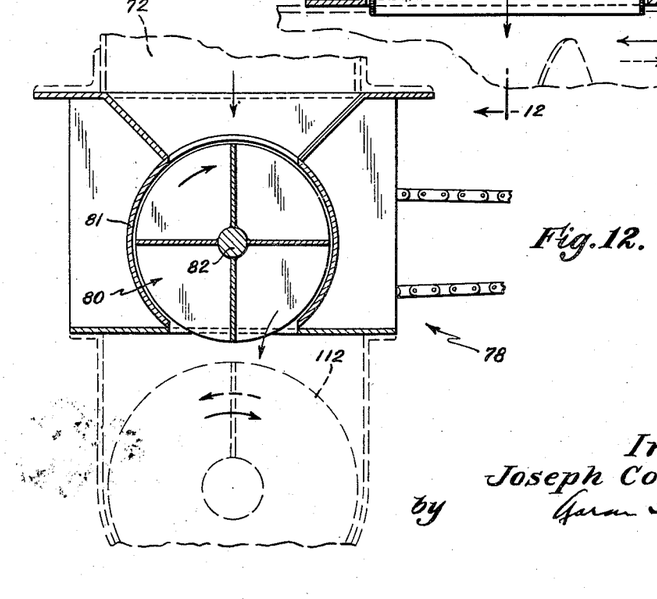
Figure 12 is a sectional view of a feeder unit taken upon the plane of the section line 12—12 of Figure 11.

As shown in Figures 6 and 7 the lower open end of stocking 31 is fastened between the inlet sides of hopper 10 and the holding ring 43 by rivets or other suitable means, the ring 43 fitting snugly within the interior perimeter of the inlet of the receiving hopper 10. The upper stocking coupling frame 32 (Figures 8 and 9) is essentially a longitudinally and centrally hinged frame having upper outwardly extending flanges 32a for coupling to the stocking frame retaining flange 42 permanently fixed to the periphery of the car unloading outlet 41, and downwardly extending flanges 32b to hold the upper open end of stocking 31. The stocking end fits around the exterior surfaces of flanges 32b and is held by the retaining ring 37 which is riveted or otherwise suitably fastened over the stocking end and to the flanges 32b as shown. As shown in Figures 8 and 9 the frame joints 35, which pass through the retaining ring 37, and the frame joint hinges 36 permit the coupling frame 32 to be opened for use or folded for storage. The locking bolt 38 in conjunction with bolt loops 39 fixed to flange 32b locks the coupling frame 32 in its open position, the position used during the car unloading procedure.

When a car is not being unloaded the stocking assembly 30 is placed in its stored position within the receiving hopper 10 as shown in Figure 6. Under these circumstances the coupling frame 32 is folded and with the attached stocking 31 is lowered to rest on brackets 40 inside the receiving hopper 10. This arrangement provides a clean and convenient stocking storage system that is fully sealed against moisture or dirt when the receiving hopper inlet cover 14 is placed in position to cover the inlet of the receiving hopper 10. Also this stocking storage system keeps the stocking clean yet facilitates rapid attachment of the stocking assembly to any car that is to be unloaded. For the car unloading procedure the cover 14 is removed, then the coupling frame 32 is lifted from its stored position in hopper 10, and after being placed in the car unloading outlet 41, is extended as shown in the full lines of Figure 9. Then the center of the coupling frame 32 is pushed up to open said frame completely as shown by the broken lines of Figure 9 so that flanges 32a rest on the stocking frame retaining flange 42. Finally, the bolt 38 is moved to lock the frame 32 in its fully extended position after which the stocking assembly 30 is ready, as shown in Figure 7, for the car unloading procedure. In its unloading position the stocking assembly 30 provides a passage for the gravity-controlled flow or material from the car being unloaded to the inlet of receiving hopper 10, said passage being suitably sealed throughout against moisture, dirt or dust external to said stocking assembly or the car being unloaded.

As shown in Figure 1 material coming from the car unloading outlet 41, is gravity-fed through the stocking assembly 30 (Figure 7), the receiving hopper 10 and into the conveyor trough of pit 2 of unloading unit 1. From said trough the spiral conveyor 50 transports the material to the spiral conveyor outlet 51 (Figure 3) which permits the material to drop to the sloping spiral conveyor 55. The spiral conveyor 55 of the unloading system 1 lifts the material to chute 57 which in turn discharges said material into the receiving inlet of bucket elevator 60, a component of storage and recirculating system 100. At the top of bucket elevator 60 driven by power means 62, the material is discharged through chute 63 to the spiral conveyor 64. Spiral conveyor 64, driven by power means 65, discharges the material through the individually operated valves 74, 75, 76 controlled either manually or automatically, into the storage bins 71, 72 and 73 respectively.

Figure 13:
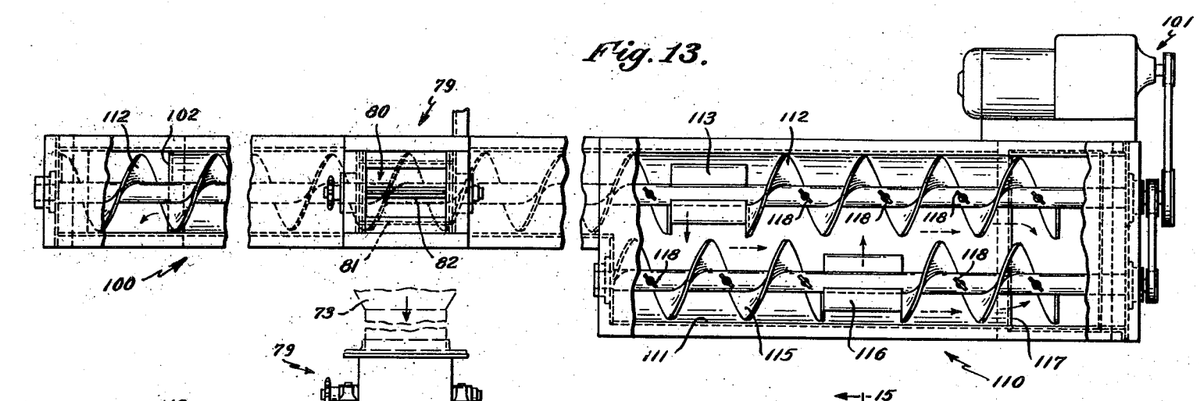
Figure 13 is a sectional plan view, with parts broken away, taken upon the plane of the section line 13—13 of Figure 1 showing the reversible spiral conveyor and its special breaker unit together with their general driving means.

The material stored in the storage bins 71, 72, 73 passes out from the open bottoms of said bins through the respective rotary vane feeders 77, 78, 79 when said material is to be used either in processing equipment or is to be recirculated through the storage and recirculation system 70. As shown in Figures 10, 11, 12, 13, 14 and 15 each rotary vane feeder, such as 78 is permanently fixed to the open bottom of its respective storage tank such as 72 and includes the four vane assembly 80 enclosed in the cylindrical open-ended housing 81 wherein the four vanes are spaced about 90° and permanently fastened to the rotatable shaft 82 supported in suitable bearings, the planes of the vane surfaces being parallel to the shaft 82 whose axis is perpendicular to the longitudinal axis of the storage tank 72 and essentially in line with the axis of the rotatable shafts of the remaining rotary vane feeders. A suitable means such as a chain drive assembly (Figure 10) connects the rotatable shaft 82 of rotary vane feeder 78 to the feeder drive shaft 84 through manually operated clutch 85 and each of the remaining rotary feeders is similarly connected to the feeder drive shaft 84. Rotation of the feeder drive shaft 84 by power means 83 causes each chain drive assembly to rotate its respective vane assembly 80 and the rotation of the vane assembly permits the passage of stored material from the bottom of the respective storage bin 72 through the respective storage bin 72 through the respective rotary feeder 78 to the reversible spiral conveyor 100 (Figure 13). Rotation of the rotary feeder vanes stirs said material as it emerges from the bin 72 to prevent formation of lumps and also serves to break up lumps of stored material that may appear at the bottom of the storage tank to impede the free flow of the stored material. The flow from each storage bin may be controlled or stopped by proper adjustment of its respective clutch 85 which controls the rotational speed of the respective vane assembly 80.

Normally the rotational direction of the reversible spiral conveyor 100 (Figures 1, 13, 14, 15) driven by reversible power means 101 is such that the granulated or powdered hygroscopic material passing into said conveyor is carried to chute 102 (Figure 1) and thence to the buckets of the second bucket elevator 103 which, driven by power means 105, lifts and discharges said material to processing equipment.

However, when the stored material is recirculated through the storage system 70 in order to prevent the formation of or eliminate the existence of lumps or caked layers of said material, the rotational direction of the spiral conveyor 100 is reversed by reversing the rotational sense of the power means 101. Under these circumstances the material passing into the spiral conveyor 100 is carried back toward the first bucket elevator 60 (Figure 1). Before reaching said elevator 60, however, all the material transported by the spiral conveyor 100 must pass through the breaker unit 110 (Figure 13) immediately adjacent said bucket elevator 60.

Figures 14, 15:
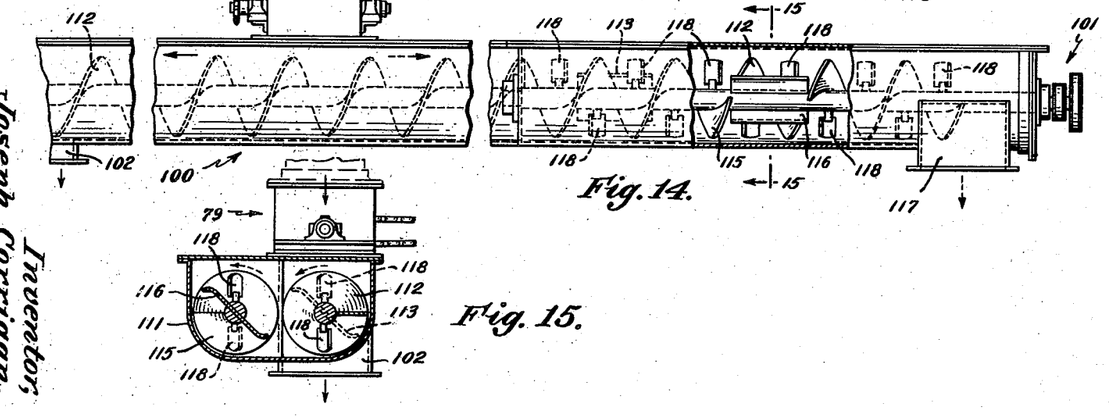
Figure 14 is a front elevation view of Figure 13 with parts broken away.
Figure 15 is a view taken upon the plane of section line 15—15 of Figure 14 showing the reversible spiral conveyor and the breaker unit.

As shown in Figures 13, 14 and 15 the breaker unit 110 comprises a section 112 of spiral conveyor 100 including that end of conveyor 100 nearest the bucket elevator 60, as well as another section of spiral conveyor 115 immediately adjacent, equal in length, and parallel to the spiral conveyor section 112, both sections 112 and 115 being enclosed by a suitable double housing 111. A suitable housing also encloses and seals the remainder of the reversible spiral conveyor 100. Spiral section 115, like spiral conveyor 112, is rotated preferably, but not necessarily at different speeds by power means 101. As shown in Figure 13 the spiral thread of the spiral conveyor section 112 is interrupted by the flat kicker vane 113 fastened to and rotating with 112 and the breaker spiral conveyor section 115 is interrupted by the flat kicker vane 116 fastened to and rotating with 115. The action of kicker vanes 113 and 116 is that of "kicking" the circulating material to and fro and in conjunction with breaker paddles 118 which are set at an angle to the direction of material flow in the spiral conveyors, efficient disintegration of any lumps or cakes of the circulating material is effected. The circulation of the material may be effected periodically, as with automatic clock timing controls (not shown).

During the recirculation process the material being transported by the spiral conveyor 100 from all or any one of the storage tanks 71, 72, 73 towards the bucket elevator 60 enters the breaker unit 110 along the spiral conveyor section 112 and is then free to be transported by both conveyor sections 112 and 115. Because the two spiral conveyor sections 112 and 115 are closely spaced, there is very little clearance between the respective spiraling threads of said conveyor sections or between the kicker vane 113 and the spiral thread of 115 or between the vane 116 and the spiral thread of 112. Consequently, any lumps or caked portions of granulated or powdered material which enter the breaker unit 110 are forced by the rotating spiral threads or the rotating vanes 113, 116 or by the breaker paddles 118 to pass between and around the rotating sections 112, 115 as well as between said sections, vanes or paddles and the housing 111. As a consequence of such treatment, said lumps or caked portions of material are broken up into fine particles which approximate the material's original powdered or granulated size.

The material thus transported through the breaker unit 110 then flows freely into the downward sloping chute 117 (Figure 1) which discharges said material into the bucket elevator 60. The bucket elevator lifts said material back to the downward sloping chute 63 and the material is again distributed to the storage tanks 71, 72, 73 by means of the spiral conveyor 64.

It will also be apparent that the circulation of the material could be effected in a forward direction as well as the reverse direction. It should be understood that all conveyors, elevators and chutes are enclosed in suitable housings that seal the system against entry by moisture, dirt, dust, insects or small animals. In short the material unloaded, stored, dispensed, or recirculated by means of the invention described herein is protected against all contaminating or harmful factors from the time said material leaves the car until it finally leaves the system to enter processing equipment.

In summary the invention described here comprises an improved automatic conveyor system that unloads bulk hygroscopic granulated or powdered material such as sugar, salt, flour, chemicals, etc. from a hopper bottom car; places said material in any one or more designated storage bins; dispenses said material to processing equipment for use; and during storage recirculates said material through said bins and the conveyor system to prevent lumps or caked layers of said material from forming; and includes means to crush and eliminate during the recirculation of said material, any existing lumps or caked layers of said material.

To unload the bulk hygroscopic material from a hopper bottom car this invention includes a pit wherein a novel collapsible stocking-like arrangement, attached to the car outlet, facilitates discharge of the bulk hygroscopic material from the car into the pit receiving hopper which, in turn, discharges said material to a pit spiral conveyor which discharges said material into a sloping spiral conveyor that transports said material to the first bucket elevator.

To place the bulk hygroscopic material in storage the said first bucket elevator lifts said material and discharges it into a spiral conveyor which, in turn, releases selected portions of said material into designated storage tanks through suitable valves.

To dispense the bulk hygroscopic material from the said storage tanks for use in processing equipment, said material is allowed to pass from the bottom openings of one or more designated storage tanks through the feeder unit associated with the specified tank. Each feeder unit is individually and automatically operated and includes a novel rotating vane arrangement that controls the flow of said material therefrom, stirs said material to prevent the formation of lumps or caked layers and also serves to break up lumps or caked layers of said material that appear at the bottom opening of the tank and impede the free flow of the bulk hygroscopic granulated or powdered material. Passing through the feeder unit said material falls to a spiral conveyor which, for processing of said material, transports said material to a second bucket elevator which, in turn, lifts and then discharges said material to a chute leading to the processing equipment.

To prevent lumps or caked layers of the bulk hygroscopic granulated or powdered material from forming during storage is one main function of said feeder unit. In addition, to prevent the formation of said lumps or caked layers the rotational sense of the last mentioned spiral conveyor, which receives material from the feeder units, is reversed to carry said material back to the first bucket elevator which again lifts it to the spiral conveyor which discharges into the storage tanks. The said material again passes through the storage tanks and the feeder units back to the spiral conveyor which receives said material from the feeder units. This movement and recirculation of the bulk hygroscopic granulated or powdered material prevents the formation in said material of lumps or caked layers.

In addition, to eliminate said lumps or caked layers a short length of spiral conveyor is placed closely adjacent and parallel to an equal length of the spiral conveyor which receives said material from the feeder units. Both these short lengths of spiral conveyor discharge into the first bucket elevator and are nearer to said elevator than the feeder unit associated with any storage tank. Also each section of said short length spiral conveyors contains a vane and paddles that rotate with the spiral conveyor. As a consequence of the location of the short lengths of spiral conveyor with respect to the first bucket elevator all material being recirculated passes through them. As a consequence of the closeness of the two short lengths of spiral conveyor to each other as well as the kicking and beating action of the vanes and breaker paddles therein and the slight clearance between each vane and the adjacent spiral conveyor, any lumps or caked layers in the material being recirculated are crushed and eliminated.

A preferred form of my invention is illustrated in the accompanying drawings but it is to be understood that my invention is not limited to the exact details shown for it is obvious that various changes in the shape, size, arrangement of parts and other modifications may be resorted to, without departing from the spirit of my invention or the scope of the subjoined claims.

I claim:

1. Apparatus for preventing and eliminating caking of bulk granulated sugar comprising a first spiral conveyor for loading said sugar on a first bucket elevator, means for unloading the sugar from the bucket elevator to a plurality of storage bins, each bin having a receiving valve at its top and outlet vanes at its bottom, the latter having independent controllable means for regulating the amount of material dispensed from each storage bin, a second spiral conveyor for loading a second bucket elevator with the dispensed sugar for dispersion to processing equipment, means for periodically reversing the direction of said second spiral conveyor for recirculating the sugar from and to the storage bins through the first bucket elevator, and means associated with said second spiral conveyor for mechanically disintegrating lumps or cakes of sugar present in said sugar.

2. In a system for preventing the caking of granulated hygroscopic materials including storage means and conveying means, means for optionally conveying all the material along either of two paths, one path leading from the storage means to a point of use of said material, the other path leading to the storage means, said latter means functioning to receive all the material from the bottom of said storage means for redelivery back to the top of said storage means.

3. The system of claim 2 wherein means are provided during the recirculation of the material for mechanically disintegrating any lumps that may be formed therein.

4. The system of claim 2 wherein means are provided for reversing the direction of flow of material from the path leading to the points of use to the path leading to the storage means.

5. Apparatus for preventing the caking and lumping of granular hygroscopic materials including means for storing a supply of said material, means for delivery of said material from said storage means to points of use, and means for optionally periodically recirculating all of said materials from the outlet of said storage means back to the inlet of the same.

6. Apparatus for preventing the caking and lumping of granular material such as sugar or the like including means for storing a supply of material, means for delivering all the material from said storing means to a point of use, means for optionally recirculating all of the material instead of delivering the material, said recirculating means including conveyor means receiving the material from the outlet of said storing means and delivering the same to the inlet of said storing means.

References Cited in the file of this patent

UNITED STATES PATENTS

| | | |
|---|---|---|
| 259,387 | Harrison | June 13, 1882 |
| 1,822,530 | Kind | Sept. 8, 1931 |
| 2,003,417 | Andreas | June 4, 1935 |
| 2,134,365 | Hale | Oct. 25, 1938 |
| 2,497,295 | Cavallier | Feb. 14, 1950 |
| 2,505,194 | Loss | Apr. 25, 1950 |
| 2,529,583 | Adams | Nov. 14, 1950 |
| 2,571,277 | Morrow | Oct. 16, 1951 |
| 2,628,724 | Sackett | Feb. 17, 1953 |
| 2,754,982 | Hoffmeister et al. | July 17, 1956 |
| 2,778,509 | Donsbach | Jan. 22, 1957 |